United States Patent
Baskaran et al.

(10) Patent No.: US 10,180,828 B2
(45) Date of Patent: Jan. 15, 2019

(54) SYSTEMS AND METHODS FOR POWER OPTIMIZATION OF PROCESSORS

(71) Applicant: Reservoir Labs, Inc., New York, NY (US)

(72) Inventors: Muthu M. Baskaran, Bayonne, NJ (US); Thomas Henretty, Brooklyn, NY (US); Ann Johnson, Saratoga, CA (US); Athanasios Konstantinidis, Brooklyn, NY (US); M. H. Langston, New Windsor, NY (US); Richard A. Lethin, New York, NY (US); Janice O. McMahon, Bethesda, MD (US); Benoit J. Meister, New York, NY (US); Paul Mountcastle, Moorestown, NJ (US); Benoit Pradelle, Brooklyn, NY (US)

(73) Assignee: SIGNIFICS AND ELEMENTS, LLC, New York, NY (US)

(*) Notice: Subject to any disclaimer, the term of this patent is extended or adjusted under 35 U.S.C. 154(b) by 29 days.

(21) Appl. No.: 14/699,876

(22) Filed: Apr. 29, 2015

(65) Prior Publication Data

US 2015/0309779 A1 Oct. 29, 2015

Related U.S. Application Data

(60) Provisional application No. 61/985,791, filed on Apr. 29, 2014.

(51) Int. Cl.
  *G06F 8/41* (2018.01)
(52) U.S. Cl.
  CPC ............ *G06F 8/4432* (2013.01); *Y02D 10/41* (2018.01)

(58) Field of Classification Search
  CPC combination set(s) only.
  See application file for complete search history.

(56) References Cited

U.S. PATENT DOCUMENTS

| | | | | | |
|---|---|---|---|---|---|
| 5,832,273 | A | * | 11/1998 | Mizuse | G06F 8/427 717/114 |
| 7,739,530 | B2 | * | 6/2010 | Takayama | G06F 1/3203 713/300 |
| 7,870,379 | B2 | * | 1/2011 | Krieger | G06F 1/26 713/100 |
| 2003/0005251 | A1 | * | 1/2003 | Wilson | G06F 9/4881 711/167 |

(Continued)

OTHER PUBLICATIONS

Benson, T. et al. "Gpu-based space-time adaptive processing (stap) for radar," in HPEC, pp. 1-6, 2013.

(Continued)

*Primary Examiner* — Chat C Do
*Assistant Examiner* — Douglas M Slachta
(74) *Attorney, Agent, or Firm* — Goodwin Procter LLP

(57) ABSTRACT

A compilation system generates one or more energy windows in a program to be executed on a data processors such that power/energy consumption of the data processor can be adjusted in which window, so as to minimize the overall power/energy consumption of the data processor during the execution of the program. The size(s) of the energy window(s) and/or power option(s) in each window can be determined according to one or more parameters of the data processor and/or one or more characteristics of the energy window(s).

42 Claims, 12 Drawing Sheets

Table 1: Energy Model Parameters

| Parameter | Description | Unit |
|---|---|---|
| $M$ | Memory footprint of an energy window | bytes |
| $W_M$ | Count of memory operations in an energy window | none |
| $W_C$ | Count of compute operations in an energy window | none |
| $W$ | Count of total operations in an energy window | none |
| $f_L$ | CPU frequency, low-energy low-performance | hertz |
| $f_H$ | CPU frequency, high-energy high-performance | hertz |
| $f_M$ | Memory bus frequency | hertz |
| $V_L$ | CPU voltage, low-energy low-performance | volts |
| $V_H$ | CPU voltage, high-energy high-performance | volts |
| $L_T$ | Time to transition between $f_L$ and $f_H$ | sec |
| $P_T$ | Dynamic power during frequency transition | watts |
| $L_M$ | Time to retrieve an 8 Byte word from main memory | sec |
| $P_M$ | Static and refresh power of $M$ Bytes of main memory | watts |
| $P_L^s$ | Static power of CPU at $f_L$ | watts |
| $P_H^s$ | Static power of CPU at $f_H$ | watts |
| $P_L^r$ | Dynamic power of floating point ops at $f_L$ | watts |
| $P_H^r$ | Dynamic power of floating point ops at $f_H$ | watts |
| $P_L^M$ | Dynamic power of memory ops at $f_L$ | watts |
| $P_H^M$ | Dynamic power of memory ops at $f_H$ | watts |

(56) References Cited

U.S. PATENT DOCUMENTS

| | | | | |
|---|---|---|---|---|
| 2004/0260959 A1* | 12/2004 | Tani | ............................ | G06F 1/26 713/300 |
| 2005/0050372 A1* | 3/2005 | Hagiwara | .............. | G06F 9/3016 713/320 |
| 2006/0179329 A1* | 8/2006 | Terechko | .............. | G06F 1/3203 713/300 |
| 2007/0208959 A1* | 9/2007 | Tani | ...................... | G06F 1/3203 713/300 |
| 2007/0255929 A1* | 11/2007 | Kasahara | .............. | G06F 1/3203 712/1 |
| 2007/0283178 A1* | 12/2007 | Dodeja | ................. | G06F 1/3203 713/324 |
| 2010/0185883 A1* | 7/2010 | Hamilton | .............. | G06F 1/3203 713/320 |
| 2012/0054773 A1* | 3/2012 | Hall | ........................ | G06F 9/468 718/108 |
| 2014/0136857 A1* | 5/2014 | Jacobson | ................... | G06F 9/46 713/300 |
| 2014/0281629 A1* | 9/2014 | Bose | ...................... | G06F 1/3228 713/323 |
| 2014/0372994 A1* | 12/2014 | Chheda | ................. | G06F 8/4432 717/146 |
| 2015/0106649 A1* | 4/2015 | Kannan | ..................... | G06F 1/08 713/501 |

OTHER PUBLICATIONS

Demmel, J. et al. "Lower bounds on algorithm energy consumptions: Current work and future directions," in SIAM Conference on Computational Science and Engineering, 2013.

Feautrier, P. "Dataflow analysis of array and scalar references," International Journal of Parallel Programming, 20(1) 23-52, Feb. 1991.

Girbal, S. et al. "Semi-automatic composition of loop transformations for deep parallelism and memory hierarchies," Int. J. Parallel Program., 34(3): 261-317, Jun. 2006.

Vasilache, N. et al. "Joint scheduling and layout optimization to enable multi-level vectorization." in Second International Workshop on Polyhedral Compilation Techniques (IMPACT'12), Paris, France, Jan. 2012.

* cited by examiner

FIG. 1

```
1  #pragma omp parallel for private(j)
2  for (i = 0; i <= 7; i++) {
3    for (j = 0; j <= 7; j++) {
4      for (k = 0; k <= 7; k++) {
5        // Power API -- Memory Bound Region
6        rp_set(MEM);
7        for (i1 = 0; i1 <= 7; i1++) {
8          _t2 = (_mins_32(-128 * j + 1021, 127));
9          for (j1 = 0; j1 <= _t2; j1++) {
10           _t3 = (_mins_32(-128 * k + 1021, 127));
11           for (k1 = 0; k1 <= _t3; k1++) {
12             b1[i1][j1][k1] = b[8 * i + i1][128 * j + j1][128 * k + k1];}}}
13       // Power API -- Memory Bound Region
14       rp_set(MEM);
15       for (i1_1 = 0; i1_1 <= 7; i1_1++) {
16         _t4 = (_mins_32(-128 * k + 1023, 129));
17         for (j1 = 0; j1 <= _t4; j1++) {
18           for (k1 = 0; k1 <= 31; k1++) {
19             a1[i1_1][j1][k1] = a[128 * i + j + i1_1][128 * k + k1];}}}
20       // Power API -- Memory Bound Region
21       rp_set(MEM);
22       for (i1_2 = 0; i1_2 <= 7; i1_2++) {
23         for (j1 = 0; j1 <= 31; j1++) {
24           filt_i[i1_2][j1] = filt[8 * i + i1_2][j1];}}
25  
```

FIG. 2A

```
26  // Power API -- Memory Bound Region
27  rp_set(MEM);
28  for (i1_3 = 0; i1_3 <= 7; i1_3++) {
29      for (j1 = 0; j1 <= 31; j1++) {
30          filt_1_1[i1_3][j1] = filt[8 * i1_3][0][2][j1];
31  // Power API -- Memory Bound Region
32  rp_set(MEM);
33  for (i1_4 = 0; i1_4 <= 7; i1_4++) {
34      for (j1 = 0; j1 <= 31; j1++) {
35          filt_1_2[i1_4][j1] = filt[8 * i1_4][0][0][j1];
36  // Power API -- Memory Bound Region
37  rp_set(MEM);
38  for (i1_5 = 0; i1_5 <= 7; i1_5++) {
39      for (j1 = 0; j1 <= 31; j1++) {
40          filt_1_3[i1_5][j1] = filt[8 * i1_5][2][1][j1];
41  // Power API -- Memory Bound Region
42  rp_set(MEM);
43  for (i1_6 = 0; i1_6 <= 7; i1_6++) {
44      for (j1 = 0; j1 <= 31; j1++) {
45          filt_1_4[i1_6][j1] = filt[8 * i1_6][1][2][j1];
46  // Power API -- Memory Bound Region
47  rp_set(MEM);
48  for (i1_7 = 0; i1_7 <= 7; i1_7++) {
49      for (j1 = 0; j1 <= 31; j1++) {
50          filt_1_5[i1_7][j1] = filt[8 * i1_7][0][1][j1];
```

FIG. 2B

```
51  // Power API -- Memory Bound Region
52  rp_set(MEM);
53  for (i1_8 = 0; i1_8 <= 7; i1_8++) {
54      for (j1 = 0; j1 <= 31; j1++) {
55          filt_i6[i1_8][j1] = filt[8 * i1 + i1_8][1][0][j1]; }}
56  // Power API -- Memory Bound Region
57  rp_set(MEM);
58  for (i1_9 = 0; i1_9 <= 7; i1_9++) {
59      for (j1 = 0; j1 <= 31; j1++) {
60          filt_i7[i1_9][j1] = filt[8 * i1 + i1_9][2][0][j1]; }}
61  // Power API -- Memory Bound Region
62  rp_set(MEM);
63  for (i1_10 = 0; i1_10 <= 7; i1_10++) {
64      for (j1 = 0; j1 <= 31; j1++) {
65          filt_i8[i1_10][j1] = filt[8 * i1 + i1_10][0][2][j1]; }}
```

FIG. 2C

```
66  // Power API - Compute Bound Region
67  rp_set(CPU);
68  for (il,il = 0; il,il <= 7; il,il++) {
69    _45 = (_mins_32(-128 * j + 1024, 127));
70    for (j1 = 0; j1 <= +45; j1++) {
71      +6 = (_mins_32(-128 * k + 1024, 127));
72      for (k1 = 0; k1 <= +6; k1++) {
73        for (i2 = 0; i2 <= 31; i2++) {
74          b_1[i1,i1][j][k1] = b_1[i1,i1][j][k1] + (a_1[i1][j][k1][i2] *
75          fi1t_1.2(i1,i1)[j][i2] + a_1[i][j][k1 + 1][i2]) +
76          fi1t_1.8(i1,i1)[j][i2] + a_1[i][j][k1 + 1][i2]) +
77          fi1t_1.6(i1,i1)[j][i2] + a_1[i][j][k1 + 1][i2]) +
78          fi1t_1.4(i1,i1)[j][i2] + a_1[i][j1 + 2][k1][i2]) +
79          fi1t_1.7(i1,i1)[j][i2] + a_1[i][j1 + 2][k1 + 1][i2]) +
80          fi1t_1.3(i1,i1)[j][i2] + a_1[i][j1 + 2][k1][i2]) +
81          fi1t_1.1(i1,i1)[j][i2]))));
82
83
```

Table 1: Energy Model Parameters

| Parameter | Description | Unit |
|---|---|---|
| $M$ | Memory footprint of an energy window | bytes |
| $W_M$ | Count of memory operations in an energy window | none |
| $W_C$ | Count of compute operations in an energy window | none |
| $W$ | Count of total operations in an energy window | none |
| $f_L$ | CPU frequency, low-energy low-performance | hertz |
| $f_H$ | CPU frequency, high-energy high-performance | hertz |
| $f_M$ | Memory bus frequency | hertz |
| $V_L$ | CPU voltage, low-energy low-performance | volts |
| $V_H$ | CPU voltage, high-energy high-performance | volts |
| $L_T$ | Time to transition between $f_L$ and $f_H$ | sec |
| $P_T$ | Dynamic power during frequency transition | watts |
| $L_M$ | Time to retrieve an 8 Byte word from main memory | sec |
| $P_M$ | Static and refresh power of $M$ Bytes of main memory | watts |
| $P_L^I$ | Static power of CPU at $f_L$ | watts |
| $P_H^I$ | Static power of CPU at $f_H$ | watts |
| $P_L^C$ | Dynamic power of floating point ops at $f_L$ | watts |
| $P_H^C$ | Dynamic power of floating point ops at $f_H$ | watts |
| $P_L^M$ | Dynamic power of memory ops at $f_L$ | watts |
| $P_H^M$ | Dynamic power of memory ops at $f_H$ | watts |

FIG. 3

Table 2: Energy Model Parameters at 45 nm and 11 nm

| PARAM | 45nm | 11nm |
|---|---|---|
| $M$ | 32KB | 32KB |
| $f_L$ | 100 MHz | 100 MHz |
| $f_H$ | 1 GHz | 1 GHz |
| $f_M$ | 500 MHz | 500 MHz |
| $V_L$ | 0.7 V | 0.4 V |
| $V_H$ | 1.2 V | 0.9 V |
| $L_T$ | 100 µs | 10 ns |
| $P_T$ | 0.875 W | 0.720 W |
| $L_M$ | 100 ns | 100 ns |
| $P_M$ | 8.423e-5 W | 5.035e-5 W |
| $P_L^I$ | 0.75 W | 0.44 W |
| $P_H^I$ | 1.0 W | 0.75 W |
| $P_L^C$ | 6.22e-3 W | 1.98e-4 W |
| $P_H^C$ | 1.105e-1 W | 1.51e-2 W |
| $P_L^M$ | 2.4 W | 0.96 W |
| $P_H^M$ | 2.4 W | 0.96 W |

FIG. 5

Table 3: Runtime Window Instance Counts for STAP Components

| BENCHMARK | CPU | MEM | TOTAL |
|---|---|---|---|
| covar | 16384 | 16384 | 32768 |
| solves | 32768 | 33024 | 65792 |
| amf | 16779264 | 16778240 | 33557504 |
| total | 16828416 | 16827648 | 33656064 |

FIG. 6

Table 4: Average window size for STAP components

| BENCHMARK | CPU | MEM | TOTAL |
|---|---|---|---|
| covar | 294912 | 1032 | 147456 |
| solves | 90720 | 866 | 36696 |
| amf | 192 | 17 | 106 |
| total | 656 | 21 | 339 |

FIG. 7

Table 5: Number of instances and operations per instance for each window in covar.

| | Window | | | |
|---|---|---|---|---|
| | 0 | 1 | 2 | 3 |
| Memory-bound window instances | 64 | 0 | 16320 | 0 |
| Memory ops/window instances | 3072 | 0 | 1024 | 0 |
| Compute-bound window instances | 0 | 64 | 0 | 16320 |
| Compute ops/window instance | 0 | 294912 | 0 | 294912 |

FIG. 8

Table 6: DVFS Transitions (Taken / Possible)

| BENCHMARK | 45 nm | 11 nm |
|---|---|---|
| covar | 2/4 | 4/4 |
| solves | 4/13 | 13/13 |
| amf | 1/7 | 7/7 |
| total | 7/24 | 24/24 |

FIG. 11

Table 7: Memory Operations and Energy Decrease

| BENCHMARK | % energy decrease | % memory operations |
|---|---|---|
| covar | 8.26 | 0.35 |
| solves | 8.77 | 1.46 |
| amf | 13.23 | 8.02 |
| total | 10.62 | 3.02 |

FIG. 12

SYSTEMS AND METHODS FOR POWER OPTIMIZATION OF PROCESSORS

CROSS-REFERENCE TO RELATED APPLICATIONS

This application claims priority to and benefit of U.S. Provisional Patent Application No. 61/985,791, entitled "Polyhedral Compilation Optimizations," that was filed on Apr. 29, 2014, the entire contents of which are incorporated herein by reference.

FIELD OF THE INVENTION

This disclosure generally relates to compilation systems for optimizing the execution of programs on various data processing hardware platforms and, in particular, to systems for optimizing the energy and/or power consumption of such platforms.

BACKGROUND

Polyhedral Model Concepts

The polyhedral model is a mathematical abstraction to represent and reason about programs in a compact representation. It is based on a generalized dependence graph (GDG) based intermediate representation (IR) containing the following information.

Statement. A statement S is a set of operations grouped together in our internal representation. Statements are the nodes of the GDG. A statement in the model often corresponds to a statement in the original program. Depending on the level of abstraction, a statement can be arbitrarily simple (e.g., a micro-operation) or arbitrarily complex (e.g., an external pre-compiled object).

Iteration Domain. An iteration domain $D^S$ is an ordered set of iterations associated with each statement S. It describes the loop iterations in the original program that control the execution of S. To model multiple levels of nested loops, iteration domains are multi-dimensional sets. We denote the order between two iterations $i_1$ and $i_2$ of S by $i_1 \ll i_2$ if $S(i_1)$ occurs before $S(i_2)$ in the program. Operations to manipulate domains and their inverse include projections to extract information along a sub-domain; image by a function to transform a domain into another domain, intersection to construct the iterations that are common to a list of domains, and index-set splitting to break a domain into disjoint pieces.

Dependence. A dependence (T→S) is a relation between the set of iterations of S and T. It conveys the information that some iteration $i^T \in D^T$ depends on $i^S \in D^S$ (i.e., they access the same memory location by application of a memory reference) and that $i^S \ll i^T$ in the original program. We write the set relation $\{(i^T, i^S) \in (T \to S)\}$ to refer to the specific iterations of T and S that take part in the dependence. Dependences between statements form the edges of the GDG and give it a multi-graph structure.

Dataflow dependence. A dataflow dependence $(T \to S)_d$ is a special kind of raw dependence. It conveys additional last-write information. When it is exact, it does not carry any redundancy (i.e., each read memory value has at most 1 producer). Array dataflow analysis is a global process involving all the statement in the considered portion of the program to determine precise dependences.

Memory reference. A memory reference F is a function that maps domain iterations to locations in the memory space. The image of $D^S$ by F represents the set of memory locations read or written by S through memory reference F. If F is injective, distinct memory locations are touched; otherwise, memory reuse exists within the program. Each statement can access multiple memory references in read and/or write mode.

Scheduling function. A scheduling function $\theta^S$ is a function that maps the iterations of S to time. It is a partial order that represents the relative execution order of each iteration of S relative to the all other iterations of any statement in the program. If the scheduling function is injective, the output program is sequential; otherwise parallel iterations exist. In particular, the order $\ll$ extends to time after scheduling is applied. Scheduling functions allow the global reordering of statement iterations. In particular, affine scheduling functions subsume many classical high-level loop transformations in traditional compiler terminology.

Loop types. We extend our scheduling representation with information pertaining to the kind of parallelism available in a loop. This information corresponds to common knowledge in the compiler community, and we use traditional terminology: (1) doall loops do not carry any dependence and can be executed in parallel; (2) permutable bands of loops carry forward-only dependencies and may be safely interchanged and tiled; (3) sequential loops must be executed in the specified order (not necessarily by the same processor); and (4) reduction loops can be executed in any sequential order (assuming the reduction operator is associative and commutative, otherwise they are degraded to sequential loops). Both schedule and loop type information are local to the statement nodes of the GDG.

Placement function. A placement function $P^S$ is a function that maps the iterations of S to hierarchies of processing elements. Its application to the iteration domain dictates (or provide hints at run time) what iterations of a statement execute where. There is an implicit relation between the type of loop and the placement function. Sequential loops synchronize linearly if executed by multiple processors, doall loops are synchronization-free, and reduction loops use tree-based synchronizations. Depending on the dependencies, sequential and reduction loops may be transformed into doall loops using locks. Placement information is local to the statement nodes of the GDG.

Primary Compiler-Mapping Phases

A polyhedral model based compiler (e.g. R-Stream™) can perform high-level automatic mapping to heterogeneous architectures and includes parallelism extraction, task-formation, locality improvement, processor assignment, data layout management, memory consumption management, explicit data movements generation (as well as their reuse optimization and pipelining with computations), and explicit synchronization generation. Many high-level optimizations in A polyhedral model based compiler (e.g. R-Stream™) can take a GDG as input and generate a new GDG with additional or altered information. Low-level optimizations occur on a different SSA-based IR, after high-level transformations are applied. The output code generated is based on the target architecture. It may be C extended with annotations and target-specific communication and synchronization library calls (OpenMP, pthreads, etc.) for SMP, CUDA for GPGPUs, etc.

Affine scheduling. A polyhedral model based compiler (e.g. R-Stream™) can perform exact dependence analysis and state-of-the-art polyhedral transformations through its joint parallelism, locality, contiguity, vectorization, and data layout (JPLCVD) affine scheduling framework. The strengths of this phase include the following: (1) it balances fusion, parallelism, contiguity of accesses, and data layout, and comes up with a communication- and synchronization-minimized program schedule; (2) it ensures that the degree of parallelism is not sacrificed when loops are fused, and it exposes and extracts all the available parallelism in the program, including both coarse-grained and fine-grained parallelism; and (3) it is applied as a single mapper phase which makes the algorithm very suitable for iterative optimization and auto-tuning.

Tiling. An important phase in the mapping process is "tiling." A tile in traditional compiler terminology represents an atomic unit of execution. The affine scheduling algorithm identifies "permutable loops" that can be tiled to create an atomic unit of execution. Tiling is done for two primary reasons: (1) to divide the computation into tasks to distribute across processors, and (2) to block the computation into chunks such that each chunk requires data that can fit in a smaller but faster memory (enabling good data locality and reuse-temporal and spatial).

A polyhedral model based compiler (e.g. R-Stream™) can partition statements into groups that can be tiled together to fit within a constrained memory space. Such a group forms an atomic unit of memory allocation. Grouping of statements determines the tile shape as well as the allocation and lifespan of local arrays (data buffers in faster memories). The tiling algorithm is guaranteed to choose tile sizes that satisfy the following criteria: (1) the data footprint of the tile does not exceed the size of the fast memories, and (2) the tile size balances the amount of computation and communication (among tiles).

Placement. The placement phase determines the placement function that maps the iterations of statements to hierarchies of processing elements in the given target system. The placement decision is dictated by the affine schedule that carries key information regarding parallelism available in a loop and potential communication/synchronization resulting from the loop. The kind of parallelism available in a loop has direct implications on how it may be executed on a hierarchical and heterogeneous parallel machine.

Local memory management. A polyhedral model based compiler (e.g. R-Stream™) can support automatic creation and management of local arrays. These arrays are placed in smaller local faster memories (caches in x86 systems and scratchpad memory or registers in GPUs) and the compiler creates bulk copies (DMA or explicit copy loops) to and from them. When data is migrated explicitly from one memory to another, opportunities arise to restructure the data layout at a reduced relative cost. Such reorderings help reduce storage utilization and can enable further optimizations (e.g., simdization).

For each parametric affine array reference A[f(x)] in the program, this phase gives a mapping to its new local references $A'_i[g_i(x)]$ where $A'_i$ represent the set of new arrays to be allocated in the local memory. Non-overlapping references to the same original array can be placed into distinct local arrays. The local arrays are created optimally to be compact.

Communication (data transfer) generation. Communication generation is invoked when there is a need (whether it arises from programmability or profitability) to explicitly transfer data between different memories (slower DRAM to faster local buffer, for example). For shared memory machines, R-Stream performs communication generation to generate DMA instructions or explicit copies that benefit from hardware prefetches. For GPUs, it generates explicit copy code to transfer data between global memory and scratchpad memory/registers.

One or more optimizations described above can enhance the execution of a software program one a target platform, i.e., a data processing system. Some data processing systems include one or more central processing units (CPUs), co-processor(s) such as math co-processor(s), dedicated and/or shared memory banks, data buffer(s), single or multi-level cache memory unit(s), etc. The above described optimizations can improve performance, e.g., by improving locality of data, reducing data communication, increasing parallelization, etc. These optimizations typically do not attempt to minimize energy/power consumption of the target platform during execution of the software program, however.

SUMMARY

In various embodiments, compilation systems described herein facilitate optimization of power/energy consumption of the target platform during execution of the software program, while also allowing for one or more of the other optimizations such as improving locality of data, reducing data communication, increasing parallelization, etc. This is achieved, in part, using a model for energy consumption to characterize and project potential energy gains from energy proportional scheduling (EPS) on a target platform. Examples of such platforms include modern data processing architectures such as Intel Broadwell™, NVidia Maxwell™, and ARM Cortex A57™, and presently developed and future PERFECT (Power Efficiency Revolution for Embedded Computing Technologies) architectures. The EPS optimizations described herein can enable a compiler to generate code that has concentrated computation operations and memory operations, in space and time, to expose depowering windows. Nimble voltage controls on various PERFECT architectures and the growing significance of static leakage power at Near Threshold Voltage (NTV) provide opportunities to save a significant amount of power, e.g., 5%, 10%, 20% or even more power by using EPS at the architecture level.

Accordingly, in one aspect a method is provided for optimizing energy consumption of a data processor while executing a program. The method includes performing by a compilation processor the steps of generating within the program a first window, and determining window type of the first window. The method also includes inserting a power control operation in the first window based on, at least in part, at least one of: (i) one or more parameters of one or more components of the data processor, (ii) one or more characteristics of the first window, and (ii) the window type of the first window. The power control operation may be inserted at the beginning and/or end of the first energy window. This process may be repeated by generating additional energy windows and by inserting corresponding power control operations in those windows.

In some embodiments, generating the first window includes generating a window of a particular size. That particular size may be determined as a function of a transition latency associated with transitioning operation of a component of data processor from a first component-operating frequency to a second-component operating frequency that is different from the first component-operating frequency. Generating the first window may include analyzing a representation of the program in a particular format, and forming, using that format, one or more groups including a sequence of statements of the program. The groups may be formed at a granularity based on, at least in part, one or more parameters of at least one component of the data processor. The particular format can be beta tree, static single assignment, source code, syntax tree, parse tree, data flow diagram, control flow graph, object code, machine code, binary code, or a combination of two or more of these formats.

In some embodiments, determining the window type of the first window includes computing a number of computation operations associated with the first window, and computing a number of memory operations associated with the first window. Arithmetic intensity of the first window is then computed as a function of the number of computation operations and the number of memory operations, The window type may be set to memory bound window if the arithmetic intensity is less than a threshold. Otherwise the window type may be set to computation bound window. The window type is thus set by the compilation processor at compile time.

In some embodiments, determining the window type of the first window includes inserting in the first window: an expression to compute at runtime a number of computation operations associated with the first window, and an expression to compute at runtime a number of memory operations associated with the first window. In these embodiments, determining the window type further includes inserting an expression to compute at runtime an arithmetic intensity of the first window as a function of the number of computation operations and the number of memory operations. An additional expression is inserted to set at runtime the window type to memory bound window if the arithmetic intensity is less than a threshold and otherwise to set the window type to computation bound window. The window type can thus be determined at runtime.

The window type of the first window can be a computation bound window or a memory bound window. Any component of the data processor can be a central processing unit (CPU), a memory bank, a cache memory module, a memory bus, a memory controller, and an application specific accelerator. In various embodiments, the power control operation modifies at runtime one or more attributes of at least one component of the data processor.

In some embodiments, one or more components of the data processor include a central processing unit (CPU), and modifying one or more attributes includes modifying an operating voltage of the CPU and/or an operating frequency of the CPU. One or more components of the data processor may further include a memory bus, and modifying one or more attributes further includes modifying an operating frequency of the memory bus. In some embodiments, one or more components of the data processor include a number of memory banks, and modifying one or more attributes includes switching off at least one of the several memory banks. Alternatively or in addition, one or more components of the data processor may include a cache memory manageable via both a hardware manager and a software manager. Modifying one or more attributes may include either: (i) switching off the hardware manager and employing the software manager, or (ii) disengaging the software manager and switching on the hardware manager.

One or more parameters of the data processor may include a transition latency associated with transitioning operation of at least one component of the data processor from a first frequency to a second frequency different from the first frequency; time to execute a compute operation; time to execute a memory operation; static power consumed by at least one component of the data processor; dynamic power consumed by at least one component of the data processor during a compute operation; and dynamic power consumed by at least one component of the data processor during a memory operation. One or more characteristics of the first window can include: a count of compute operations, a count of memory operations, an estimated compute time, an estimated number of compute cycles, an estimated number of data access cycles; and a memory footprint.

In some embodiments, the window type of the first window is computation bound window, and the power control operation changes an operating voltage of a CPU of the data processor from a first value to a second value that is greater than the first value only if a parameter related to compute operations is greater than or equal to a function of a transition latency associated with transitioning operation of the CPU from a first CPU frequency to a second CPU frequency greater than the first CPU frequency. The parameter related to compute operations can include one or more of: a count of compute operations, an estimated number of cycles associated with the compute operations, a measured number of cycles associated with the compute operations, an estimated time required for the compute operations, a measured time required for the compute operations, an estimated energy required by the compute operations, a measured energy required by the compute operations, an estimated power required by the compute operations, and a measured power required by the compute operations. The power control operation may further change an operating frequency of a memory bus of the data processor from a second memory bus frequency to a first memory bus frequency that is less than the second memory bus frequency.

In some embodiments, the window type of the first window is memory bound window, and the power control operation changes an operating voltage of a CPU of the data processor from a second value to a first value less than the second value only if a parameter related to memory operations is greater than or equal to a function of a transition latency associated with transitioning operation of the data processor from a second CPU frequency to a first CPU frequency less than the second frequency. The parameter related to memory operations may include one or more of: a count of memory operations, an estimated number of cycles associated with the memory operations, a measured number of cycles associated with the memory operations, an estimated time required for the memory operations, a measured time required for the memory operations, an estimated energy required by the memory operations, a measured energy required by the memory operations, an estimated power required by the memory operations, and a measured power required by the memory operations. The power control operation may further change an operating frequency of a memory bus of the data processor from a first memory bus frequency to a second memory bus frequency that is greater than the first memory bus frequency.

In some embodiments, the power control operation is based on, at least in part, an operation count associated with the first window. The operation count may be determined at runtime, and the power control operation may modify at runtime one or more attributes of at least one component of the data processor only if the operation count is greater than a threshold.

The method may further include performing by the compilation processor the steps of generating within the program a second window, and determining window type of the second window. The compilation processor may insert a power control operation in the second window based on, at least in part, at least one of: (i) one or more parameter of the data processor, (ii) one or more characteristics of the second window, and (ii) the window type of the second window.

The compilation processor may identify and remove redundant power control operations, e.g., with respect to the first and second energy windows.

In another aspect, a compilation system for optimizing energy consumption of a data processor while executing a program includes a first processor and a first memory in electrical communication with the first processor. The first memory includes instructions which, when executed by a processing unit that may include the first processor and/or a second processor and that is coupled to a memory module include either the first memory or a second memory, or both, program the processing unit to generate within the program a first window, and to determine window type of the first window. The processing unit is also programmed to insert a power control operation in the first window based on, at least in part, at least one of: (i) one or more parameters of one or more components of the data processor, (ii) one or more characteristics of the first window, and (ii) the window type of the first window. The power control operation may be inserted at the beginning and/or end of the first energy window. The processing unit may be programmed to generate additional energy windows and to insert corresponding power control operations in those windows. In various embodiments, the instructions can program the processing unit to perform one or more of the method steps described above.

In another aspect, an article of manufacture that includes a non-transitory storage medium has stored therein instructions which, when executed by a processing unit program the processing unit, which is in electronic communication with a memory module, to generate within the program a first window, and to determine window type of the first window. The processing unit is also programmed to insert a power control operation in the first window based on, at least in part, at least one of: (i) one or more parameters of one or more components of the data processor, (ii) one or more characteristics of the first window, and (ii) the window type of the first window. The power control operation may be inserted at the beginning and/or end of the first energy window. The processing unit may be programmed to generate additional energy windows and to insert corresponding power control operations in those windows. In various embodiments, the instructions can program the processing unit to perform one or more of the method steps described above.

BRIEF DESCRIPTION OF DRAWINGS

Various embodiments of the present invention taught herein are illustrated by way of example, and not by way of limitation, in the figures of the accompanying drawings, in which:

Figure 1:
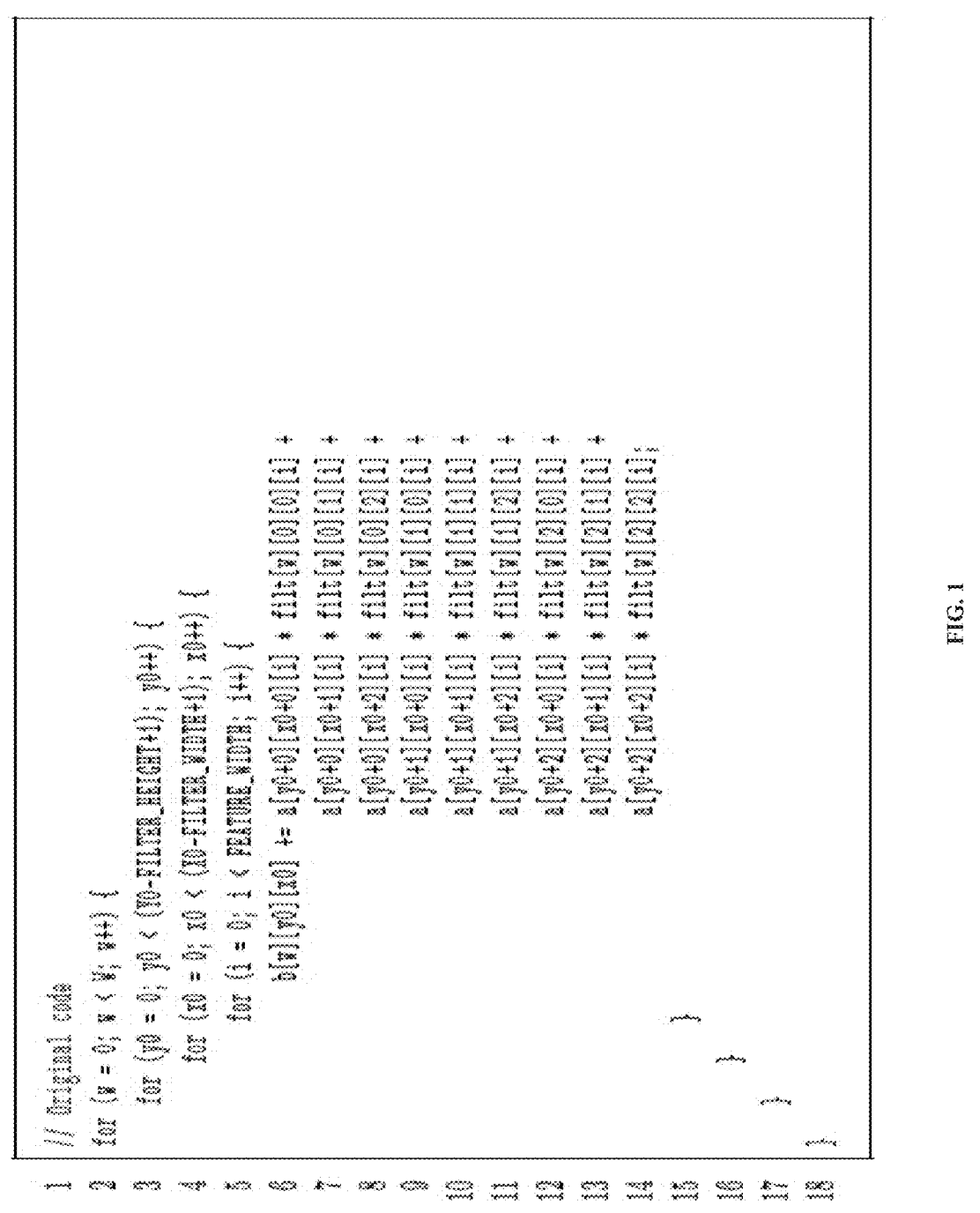

FIG. 1 depicts an example code segment that can be executed on a data processing system;

FIGS. 2A-2E depict a code segment corresponding to the code segment depicted in FIG. 1 and including energy windows generated by a compilation method according to one embodiment;

FIG. 3 shows various parameters of an example data processing system;

FIG. 5 depicts various energy parameters of an example data processor fabricated using 45 nm technology and another example data processor fabricated using 11 nm technology;

FIG. 6 depicts numbers of compute, memory, and total operations associated with three benchmark procedures of STAP analysis;

FIG. 7 depicts average sizes of energy windows according to one embodiment, for the benchmarks depicted in FIG. 6;

FIG. 8 depicts the number of instances and corresponding number of operations in four different types of windows associated with the covar kernel shown in FIG. 6;

FIG. 11 depicts possible voltage/frequency transitions and transitions actually performed, according to one embodiment targeted for a 45 nm data processor and another embodiment targeted for an 11 nm data processor; and FIG. 12 depicts a relationship between the number of memory operations and the energy savings obtained according to one embodiment.

DETAILED DESCRIPTION

Figure 4:
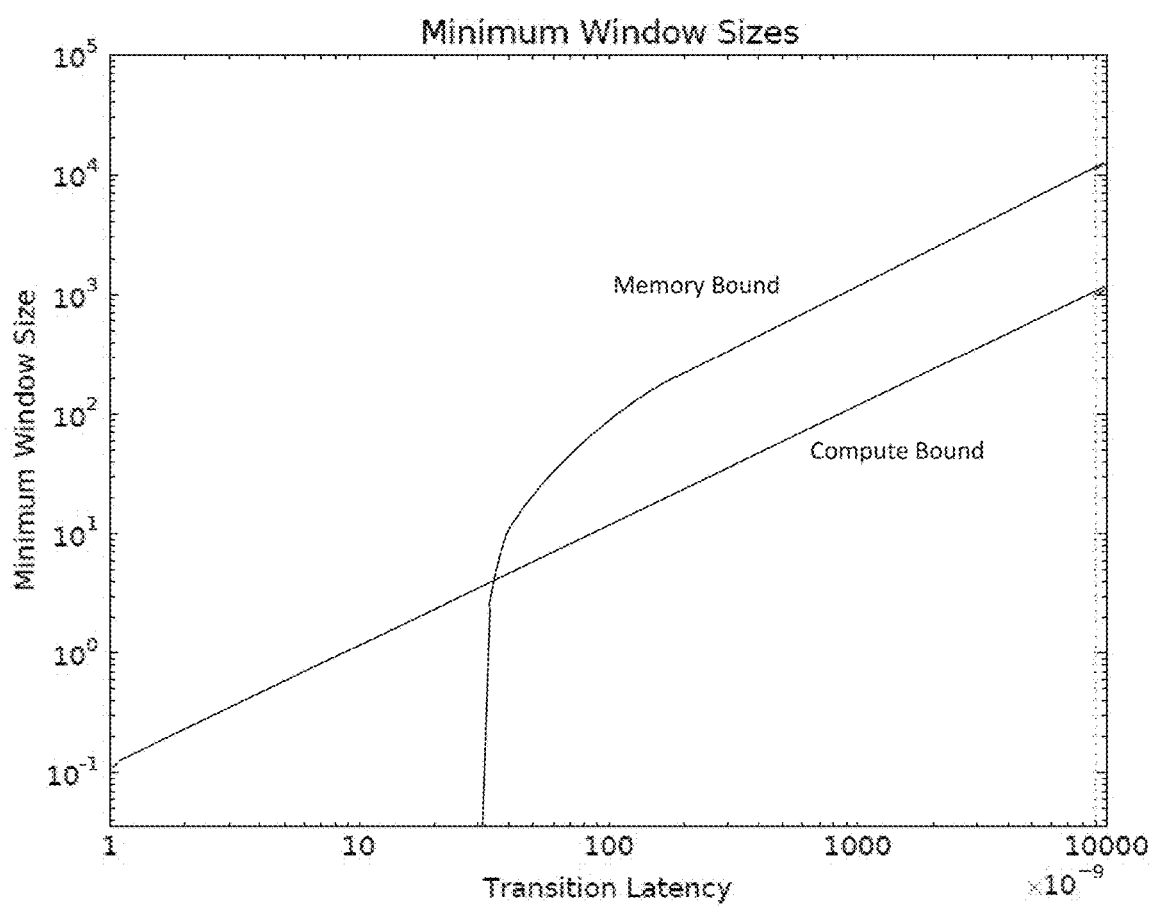
FIG. 4 depicts a relationship between transition latency of a central processing unit (CPU) of a data processor and size of energy window at which changing a power option is profitable, according to one embodiment.

Energy Proportional Scheduling (EPS) is a compilation technique that can (1) creates segment of code having determinable energy consumption characteristics with respect to system components (e.g., CPU, main memory, etc.), and can (2) insert system control functions, operations or expressions at the beginning of these code segments that set and/or control one or more system parameters. Voltage and frequency of one or more system components may be set to levels that maximize performance and minimize energy consumed. In some embodiments, one component (e.g., a delay buffer, a general purpose processor, etc.) may be selected instead of another component (e.g., cache memory, a floating-point processor), or vice versa. A data processor may also include a cache memory selectively manageable via either a hardware manager or a software manager. In some embodiments, certain components (e.g., a memory bank, a math co-processor, etc.) may be shut down during the execution of a code segment. The segments of code are referred to as "energy windows."

The objective of EPS in a polyhedral model based compiler (e.g. R-Stream™) is to reduce system energy consumption of a program during its execution with the help of polyhedral compiler transformations. A polyhedral model based compiler (e.g. R-Stream™) can perform state-of-the-art polyhedral transformations through its JPLCVD optimization framework. The motivation for EPS is to modify the existing JPLCVD framework to account for energy as a first class co-optimization target (JPLCVDE).

Our techniques target hierarchical space-time energy proportional scheduling. The need for this may arise because PERFECT hardware, in general, can include several compute units with hierarchical memories and finer-grained control of supply voltage and clock. Energy consumption resulting from leakage current may make it even more important to disable idle circuits and to create windows in which circuits can be disabled.

Therefore, we implemented a space-time energy proportional scheduling algorithm operating on the polyhedral representation of input source code. This procedure is referred to as "energy window creation" (EWC). This procedure can work in conjunction with JPLCVD optimizations in a polyhedral model based compiler (e.g. R-Stream™) to both identify and create windows in a program where manipulating frequency and/or voltage settings and/or other parameters of system components has the potential to reduce energy consumption with little or no performance impact.

Energy Window Creation

The aim of the EWC is to reduce energy consumption in a region of mapped code at a coarse-grained or fine-grained level. EWC may be included as an additional mapping phase in a polyhedral model based compiler (e.g. R-Stream™) after the following phases: affine scheduling, tiling, placement (at various processor levels), memory management (at various memory levels), data movements generation (as well as their reuse optimization and pipelining with computations), and synchronization generation. After the tiling phase in a polyhedral model based compiler (e.g. R-Stream™), the intermediate transformed program is represented as a tree of imperfectly nested loops. The non-leaf nodes in the tree are loops and the leaf nodes are the statements in the program. The tree structure is characterized by one or more integer vectors called "beta vectors," where a beta vector can specify relative nesting of statements. This tree representation is called the "beta tree." Statements have identical first d beta components if and only if they are nested under d common loops. As soon as the beta component differs, the loops are distributed. The ordering of the loops is consistent with the order of the beta component.

EWC performs two tasks: (1) creates regions of code called "energy windows" and inserts "power control operations" for each window and (2) statically characterizes the identified region or energy window to evaluate "power control metrics." The total number of loads and stores and the total number of compute operations within the energy window may be collected statically to calculate the "arithmetic intensity" (a function of computation to memory load/store) of the window and use it as the power control metric. The total number of memory and compute operations can be either completely determined statically or may be abstracted statically to be evaluated quickly at runtime. The power control operations are operations applied at runtime to set one or more parameters (e.g., voltage, frequency, switched ON, switched OFF, etc.) of key system components to appropriate levels for energy optimization. In an energy window, the power control operations are generally inserted at the start of the window or at the end thereof.

The procedure to identify regions or windows for energy optimization works as follows. In some embodiments, the procedure performs a breadth-first traversal on the tree structure induced by the beta vectors and forms groups of perfectly nested consecutive loops. In some embodiments, one or more groups of includes a sequence of statements. In some embodiments, the program is represented in a format such as static single assignment, source code, syntax tree, parse tree, data flow diagram, control flow graph, etc., and the grouping of a sequence of statements is performed in that format. The grouping may be done at any granularity from coarse to fine. When the windows are created at a coarser granularity, the grouping is done such that there is a nest of constituent loops in the group or the constituent loops have a high trip count, i.e., the total number of times a loop executes. The granularity at which windows are created may depend on a statically defined threshold value that is fixed based on one or more parameters of the underlying target architecture such as the latency to switch voltage/frequency, etc. The value of the threshold may be determined using a model of execution time and energy consumption such that the size or granularity of the window is large enough to generally amortize the cost of switching voltage and frequency.

In modern conventional architectures, we need large coarse-grained energy windows to demonstrate power savings because of the high latency to switch voltage/frequency. For future PERFECT architectures in which the switching latency is expected to be much lower than the current architectures, energy windows can be finer in granularity (although too finer windows may still not be energy efficient).

For each identified window, the shape and size of the region is statically analyzed with polyhedral machinery to identify the volume of operations (loads, stores, and compute operations) within the region. If the size of the region is parameterized with runtime program parameters, the total number of memory and compute operations can be represented as an affine expression of the parameters that can be quickly evaluated at runtime to calculate the actual value. If the size is statically known, the total number of memory and compute operations is statically calculated. We calculate the arithmetic intensity A of a window from the number of memory and compute operations. We classify a window as compute bound (CPU bound) or memory bound depending on its arithmetic intensity A and a statically defined platform-specific i.e., based on one or more characteristics of a data processing system to be used for executing the program, threshold value $T_A$. Windows with $A \geq T_A$ are generally called CPU bound, while windows with $A < T_A$ are memory bound.

Many compilers also lack the ability to systematically identify energy windows, as described herein. A programmer may manually designate a region of the program as compute bound or memory bound. Such designation, however, is not based on a systematic analysis of the program such as the beta-tree based analysis, and can be incorrect. Moreover, in conventional modern CPU architectures, we generally do not have the ability to perform DVFS operations on cache banks, memory banks or memory controllers from software. Thus, conventionally, processors are set to "maximum speed" before a compute bound window and to "minimum speed" before a memory bound window, if such windows are specified by the programmer.

The EPS technique described herein can create energy windows in programs and enables low-overhead execution of appropriate "power control" operations in the output code to reduce overall system energy consumption. The compiler can also provide the opportunity to automatically generate multiple code versions each with energy windows of varying granularity and facilitate an iterative search (or a search through an auto-tuning framework) to select an energy window granularity that is more effective for the underlying system.

To enable EPS across a variety of platforms, we have implemented a platform-independent Power API. This API specifies functions for monitoring and controlling voltage, frequency, energy, and power consumption of a chip. The power API can be used to select one or more components and/or to power down one or more components, as well.

For illustration purposes, we take a key computation kernel, namely convolution, in object recognition algorithms such as the one based on deformable parts model (DPM). The original convolution code depicted in FIG. 1 is transformed using mapping phases of a polyhedral model based compiler (e.g. R-Stream™) and the Power API calls for manipulating CPU frequency are automatically inserted by the energy window creation phase, immediately prior to memory and compute heavy loops, to produce the code shown in FIGS. 2A-2E.

Energy Model

In some embodiments, a run time and energy model includes: (i) Distinct CPU voltage frequency states: A high-frequency, high-performance, and high-power voltage-frequency state is modeled along with a low-frequency, low-performance, low-power state; (ii) Transition latency: The time taken to change any component of a data processing system (e.g., one of the CPUs, memory bank(s), memory bus(ses), input/output unit(s), co-processor(s), memory controller(s), application specific accelerator(s), etc.), from one distinct voltage-frequency state to another is modeled; and (iii) Window computational profile: Compute- and memory-bound windows are modeled. This model may be used to calculate minimum window sizes for effective EWC at both current and projected transition latencies. The model can also be used to provide preliminary guidance for potential energy gains at smaller process technologies.

Software and Hardware Model

The model for energy consumption considers a number of parameters representing characteristics of the energy window and the machine i.e., a data processing system, the window will be executed on. These parameters are summarized in Table 1 shown in FIG. 3. The data processing system may include one or more central processing units (CPUs), one or more math co-processors, memory bus(ses), memory bank(s) and other components such as buffer(s), cache memory module(s), memory controller(s), application specific accelerator(s), etc. In different data processing systems, the operating frequencies and/or voltages of one or more CPUs, one or more memory buses, application specific accelerator(s), and/or one or memory banks can be selected from a range of available values. In some architectures, the range of available values includes a designated low value and a designated high value. More than two, e.g., 3, 4, 5 voltage and/or frequency values are also contemplated. In general, operating frequencies and/or voltages or any component typically included in a computing system can be adjusted and/or one or more of such components can be selectively turned on or off.

We consider energy windows with the following characteristics:

M=memory footprint (or size of the memory) of the data used by the window
$W_C$=total number of compute operations
$W_M$=total number of memory operations $$W = W_C + W_M = \text{total number of operations}$$

In some embodiments, compute operation can be completed in one CPU cycle. We consider a CPU with each two operating frequencies, $f_L$ and $f_H$:

$f_L$=lowest CPU frequency
$f_H$=highest CPU frequency $$C_L = \frac{1}{f_L}$$

$$C_H = \frac{1}{f_H}$$

$C_L$ and $C_H$ are the associated cycle times at each frequency. $V_L$ and $V_H$ are the CPU voltages associated with $f_L$ and $f_H$:

$V_L$=CPU voltage at $f_L$
$V_H$=CPU voltage at $f_H$

Frequency $f_H$ and the associated voltage $V_H$ are a high performance and high power consumption state; Frequency $f_L$ and $V_L$ is the complementary state for low performance and reduced power consumption.

The memory bus frequency $f_M$ specifies the speed at which 8 byte words can be transferred to and from main memory, where one word can be transferred in one memory bus cycle.

$f_M$=memory bus frequency

The following latencies are modeled:
$L_T$=transition latency
$L_M$=memory latency Changing voltage and frequency generally requires a fixed amount of time referred to as the transition latency $L_T$. During the transition period energy is consumed but no useful work is accomplished. We assume all memory operations in a window are penalized by the memory latency $L_M$ of the initial operation and take one memory bus cycle per 8 byte word for subsequent transfers. Compute operations are assumed to continue while memory operations are outstanding.

System power overhead, including static leakage as a dominant component, is considered at $f_L$ and $f_H$:

$P_H^I$=power from system overhead (static leakage, cooling, etc.) at $f_H$ $P_H^I$ represents system overhead at $f_H$. We approximate the behavior of system overhead to scale linearly with voltage in a similar manner to static leakage, thus $P_L^I$ (system overhead at $f_L$) scales with the change in voltage of a system:

$$P_L^I = \frac{V_L}{V_H} P_H^I$$

The power of performing compute operations is considered at $f_L$ and $f_H$ $P_L^C$=power from computation at $f_L$
$P_H^C$=power from computation at $f_H$ The power consumed by memory bus transactions is considered at both $f_L$ and $f_H$:

$P_L^M$=power from memory bus transactions at $f_L$
$P_H^M$=power from memory bus transactions at $f_H$ Power consumed during voltage-frequency transitions is also considered:

$P_T$=power during voltage frequency transition

Main memory power consumption is modeled with δM.

δM=power per byte of storage in main memory in W/byte
$P_M$=δ$_M$M=main memory static and refresh power This quantity multiplied by the memory footprint of a window M yields $P_M$, the power consumed by main memory during a window.

Timing Model

We first examine CPU bound windows. Execution times for a window at the lowest and highest frequencies available are modeled by the following equations:

$$t_L^C = C_L W_C + C_M W_M + L_M \quad (1)$$

$$t_H^C = C_H W_C + C_M W_M + L_M + L_T \quad (2)$$

Execution time is modeled as a sum of contributions from compute operations, memory operations and, in the case of high-frequency execution, the transition latency. In the case where a DVFS transition is not made, the $L_T$ term can be eliminated.

We next examine memory bound windows. Here, execution time is bound by memory subsystem performance:

$$t_L^M = C_M W_M + L_M + L_T \quad (3)$$

$$t_H^M = C_M W_M + L_M \quad (4)$$

Execution time is modeled as a sum of the time to transfer all words of data on the memory bus and the latency of one memory operation. In the case of low-frequency execution, the transition latency is also added. Again, in the case where a DVFS transition is not made, the $L_T$ term can be eliminated.

Energy Consumption Model

We next derive expressions for the energy consumed by a window using the timing model described above. The energy required to execute compute bound windows is modeled at low and high frequencies by considering execution time, operation counts, main memory activity, system overhead, and DVFS transition periods:

$$E_L^C = C_M W_M P_L^M + t_L^C P_M + t_L^C P_L^I$$

$$E_H^C = C_M W_M P_H^M + t_H^C P_M + t_H^C P_H^I + L_T P_T$$

Expanding the time terms and simplifying leads to equations for compute bound window energy consumption:

$$E_L^C = C_L W_C (P_L^C + P_M + P_L^I) + C_M W_M (P_L^M + P_M + P_L^I) + L_M (P_M + P_L^I) \quad (5)$$

$$E_H^C = C_H W_C (P_H^C + P_M + P_H^I) + C_M W_M (P_H^M + P_M + P_H^I) + L_M (P_M + P_H^I) + L_T (P_T + P_M + P_H^I) \quad (6)$$

For compute-bound windows there may be cases where DVFS transitions do not occur. In these cases we remove the $L_T(P_T + P_M + P_H^I)$ term to compute energy at $f_H$; the expression for computing the energy of a window at $f_L$ remains unchanged. We model total energy consumption of a memory bound window at low and high frequencies by considering, again, execution time, operations, main memory activity, system overhead and DVFS transition periods:

$$E_L^M = C_L W_C P_L^C + C_M W_M P_L^M + t_L^M P_M + t_L^M P_L^I + L_T P_T$$

$$E_H^M = C_H W_C P_H^C + C_M W_M P_H^M + t_H^M P_M + t_H^M P_H^I$$

We expand the time terms $t_L^M$ and $t_H^M$, then rearrange to obtain the equations for memory bound window energy consumption:

$$E_L^M = C_L W_C P_L^C + C_M W_M (P_L^M + P_M + P_L^I) + L_M (P_M + P_L^I) + L_T (P_T + P_M + P_L^I) \quad (7)$$

$$E_H^M = C_H W_C P_H^C + C_M W_M (P_H^M + P_M + P_H^I) + L_M (P_M + P_H^I) \quad (8)$$

For memory-bound windows we remove the $L_T(P_T + P_M + P_L^I)$ term when there is no DVFS transition to compute energy at $f_L$; the expression for computing the energy of a window at $f_H$ remains unchanged.

Window Size Constraints

We can use the energy and timing models described above to constrain the sizes of compute- and memory-bound windows sizes. In some embodiments, window sizes, in terms of operation counts, are restricted so that a voltage-frequency transition at the start of a window will be profitable with respect to energy consumption. We define $W_{min}^{CPU}$ to be the minimum window size required in order for a transition from $f_L$ to $f_H$ at the start of the window to be profitable. Similarly, $W_{min}^{MEM}$ is defined to be the minimum window size required in order for a transition from $f_H$ to $f_L$ at the start of a memory-bound window.

We first consider compute-bound windows. For a transition from $f_L$ to $f_H$, we require in some embodiments, that the cost of transitioning voltage-frequency is amortized by the energy savings achieved. We use execution time as a proxy for energy consumption and require that the inequality $t_H^C < t_L^C$ is satisfied:

$$C_H W_c + C_M W_m + L_M + L_T < C_L W_c + C_M W_m + L_M$$

Simplifying and rearranging, we obtain the following expression for the minimum number of compute operations in a CPU bound window:

$$W_C > \frac{L_T}{C_L - C_H} \quad (9)$$

We observe that the minimum number of compute operations in a window $W_C$ is directly proportional to the transition latency $L_T$, in some embodiments.

We next consider memory bound windows. We note that EWC (e.g., using communication generation facilitated by a polyhedral model based compiler such as R-Stream™) can place main memory-to-cache transfers into their own windows with no associated compute operations. Thus we can eliminate the compute terms from Equations (7) and (8).

$$E_L^M = C_M W_M P_L^M + t_L^M P_M + t_L^M P_L^I + L_T P_T$$

$$E_H^M = C_M W_M P_H^M + t_H^M P_M + t_H^M P_H^I$$

For a transition from $f_H$ to $f_L$, we require that the inequality $E_L < E_H$ is satisfied. Therefore:

$$C_M W_M P_L^M + t_L^M P_M + t_L^M P_L^I + L_T P_L < C_M W_M P_H^M + t_H^M P_M + t_H^M P_H^I$$

Simplifying and rearranging, we obtain the following inequality:

$$W_M > \frac{L_T(P_T + P_M + P_L^I) - L_M(P_H^I - P_L^I)}{C_M(P_H^M - P_L^M + P_H^I - P_L^I)} \quad (10)$$

We observe that, given a fixed memory latency $L_M$, the number of memory operations in a window $W_M$ is directly proportional to the transition latency $L_T$, in some embodiments. Thus faster voltage switches enable smaller windows and finer grained control over DVFS. This is illustrated in FIG. 1. Depending on whether only one or both constraints (9) and (10) are satisfied, in some embodiments, the frequencies of only one or more CPUs may be changed and the frequencies of other component(s) are not changed, or frequencies of one or more memory banks and/or one or more memory busses may be changed but the frequencies of other component(s), including one or more CPU(s) are not changed. In some embodiments, either or both of these constraints may be used to switch off a hardware manager of a cache memory and employing a software manager to manage the cache memory, or to disengage the software manager and to switch on the hardware manager. Typically, a hardware manager is used if the constraint (9) is true and a software manager is used if the constraint (10) is true. Depending on whether only one or both constraints (9) and (10) are satisfied, in general, the frequencies of one or more components of a data processing system are changed while frequencies of one or more other component may not be changed. One or more components may be switched on or switched off. In some embodiments, however, the frequencies of all components may be changed.

Equations (9) and (10) may also be used to constrain the sizes of compute-bound and memory-bound windows, respectively. In particular, the following constraints may be considered.

$$W_{min}^{CPU} = W_C + W_M \text{ s.t. } W_C > \frac{L_T}{C_L - C_H} \quad (11)$$

$$W_{min}^{MEM} = W_C + W_M \text{ s.t. } W_M > \frac{L_T(P_T + P_M + P_L^l) - L_M(P_H^l - P_L^l)}{C_M(P_H^M - P_L^M + P_H^l - P_L^l)} \quad (12)$$

Using constraints (11) and or (12), energy windows of type compute bound can be generated such that the size of the window is at least equal to $W_{min}^{CPU}$ specified by Equation (11). Similarly, energy windows of type memory bound may be generated such that the size of the window is at least equal to $W_{min}^{MEM}$ specified by Equation (12).

In some embodiments, after being classified as a compute bound window, constraints (11) and (12) may be applied at compile time. If window size can be determined statically, the Power API calls may be inserted where appropriate. If window size cannot be statically determined, a lightweight runtime check of window size guarding a Power API call may be inserted. FIG. 1 shows minimum window size for a range of transition latencies on an exemplary machine described above. Reducing transition latency can have a substantial impact on the granularity of energy windows. For small enough transition latencies a profitable minimum window size of 1 operation can be achieved.

In some embodiments, instead of using compute and/or memory operation counts as the constraint parameters, one or more other parameters related to these counts, such as number of cycles associated with the compute and/or memory operations, time required for the compute and/or memory operations, energy required by the compute and/or memory operations, and power required by the compute and/or memory operations, can be used to set a power control option and/or energy window size at compile and/or runtimes. These parameters can be estimated using energy window characteristics and/or one or more parameters of the data processor component(s), or can be measured, e.g., from a previous tile iteration, at runtime.

Once all the power control operations have been inserted in an energy window, generally at energy window boundaries, some of the operations may be redundant. For example, if energy windows are formed consecutively in a programs, it is often unnecessary to reset voltage and frequency at the end of a preceding energy window if a new setting is applied soon after, as the next energy window starts. In some embodiments, the EPS technique described herein can detect power control operations which are redundant with another one, and can remove such redundant operations, partially or entirely, from the modified program.

A power control operation O1 is considered to be redundant with another power control operation O2, if O2 is executed soon after O1 when the program runs. Soon after generally means without the execution of a certain number of other program statements between the operations O1 and O2. The power control operations O1 and O2 can potentially be the same operation. Techniques such as searching for loops or counting the number of operations between the two power control operations (e.g., in a beta tree, syntax tree, a graph, etc.), can be used to estimate if the two operations will be executed within a short period of time. Complex analysis can also be employed to estimate the proximity of two operations.

Once two power control operations are determined to be close, the operation O1, redundant with O2, can be restricted to run only in cases where O2 does not run. Such restriction can be applied by identifying specific redundancy cases and by modify the program accordingly. We describe hereafter three common cases as an example of the possible usages of this technique.

If both O1 and O2 are in the same loop and if O1 is textually before O2 in the program, the iteration domain of O2 can be subtracted from the iteration domain of O1 to remove the redundancy; if the operations O1 and O2 are in the same loop, O1 being one of the last loop instructions and O2 being one of the first loop instructions, and if O1 and O2 have the same iteration domain, then O1 can be hoisted after the loop; if the operations O1 and O2 designate a single power control operation performed at the beginning of a loop and if no other power control operations are performed in the loop, the power control operation can be hoisted before the loop. This technique is not restricted to the described example cases, and can also be applied to other cases. The power control operation redundancy detection and correction process described herein can be repeated as long as opportunities to eliminate redundant power options can be found in the program.

Results

We demonstrate results for EPS using the space-time adaptive processing STAP benchmarks. Results are generated for these kernels by a model designed to reflect typical PERFECT architecture capabilities including fast dynamic voltage and frequency scaling (DVFS) transitions and process technology that is significantly smaller than the current state-of-the-art. Instrumented code is used to gather counts of significant high-level events such as compute and memory operations. These counts are assigned energy and power costs to arrive at an estimate of power consumption on PERFECT architectures with respect to existing fabrication technologies, (also known as process technologies or semiconductor device fabrication nodes), such as in 45 nm, 32 nm, 22 nm, 14 nm, etc. It should be understood that STAP benchmarks and PERFECT architectures are used for experimentation and/or illustration only. In various embodiments, the techniques described herein can be used with any kind of software, because software generally involves computations and/or memory operations. These techniques can be used to optimize the execution of software using any data processing system that may include one or more CPUs, one or more memory banks, cache memory unit(s), buffer(s), co-processor(s), and other components.

Several benchmarks considered in analyzing various embodiments described above are components of the STAP kernel. The kernel is divided into three separate benchmarks: (i) Covariance estimation; (ii) Linear system solves; and (ii) AMF weighting. EPS results are collected using the timing and energy models described above. The results described below can be indicative of the relative performance gains enabled by some of the hardware features expected in PERFECT architecture including fast voltage-frequency switching and substantially smaller silicon feature sizes.

The model describes an exemplary chip at both 45 nm and 11 nm. Model parameters are set as shown in Table 2 shown in FIG. 5. M is conservatively set to 32 KB on the assumption that the working set size of a window has been sized by a polyhedral model based compiler (e.g. R-Stream™) to completely fill a 32 KB L1 cache. CPU frequencies $f_L$ and $f_H$ are set to 100 MHz and 1 GHz. Memory bus frequency $f_M$ is conservatively set to 500 MHz with 1 8 byte word transferred per cycle. The code is assumed to operate at double precision.

Our model assumes a small, simple chip and thus we set static power/system overhead $P_H^I$ to 1 W at both process technologies. Voltages are set for both process technologies and $P_L^I$ is set accordingly to 0.75 W at 45 nm and 0.44 W at 11 nm. Total energy cost of a flop may include 3 L1 accesses for loading and storing operands in addition to the cost of computation. Energy is converted to power $P_L^C$ and $P_H^C$ at each operating frequency. Floating point operations are modeled to complete in 1 cycle, thus power in watts is computed by multiplying total energy per flop by operating frequency. In some embodiments, memory transfer cost may not change between low and high frequency CPU operation.

Transition latency $L_T$ is set at 100/is for 45 nm and 10 ns for 11 nm. An 100 μs $L_T$ value is consistent with a fast off-die voltage regulator; 10 ns is a conservative estimate of performance for the Columbia University SIVR voltage regulator. Transition power $P_T$ is set halfway between $P_L^I$ and $P_H^I$, assuming a linear decrease in power from $P_H^I$.

Memory refresh power is calculated from power consumption figures provided by known techniques for DDR3 and DDR4 memories. Only the amount of memory M=32 KB being used by a window is considered; total power numbers of a memory module are scaled by the fraction of the module used by a window to arrive at $P_M$.

Versions of various communication optimized codes were produced with energy proportional scheduling applied. These codes were executed to determine window sizes and a count of how many times each window was executed. These results are coupled with the performance and energy models described above to determine EPS effectiveness on PERFECT-scale architectures.

Table 3, depicted in FIG. 6, shows run time "window instance" counts for various STAP benchmarks. "Window instances" refer to the number of windows actually executed based on program parameter values and problem sizes. For example, in covar there are four windows in the source code executed a total of 32768 times. While the number of compute- and memory-bound windows are similar, Table 4 shown in FIG. 7 reveals that the average compute-bound window is substantially longer than the average memory-bound window.

Table 4 shows the average window size for each of several STAP kernels. Compute-bound windows for covar and solves, on average, are long enough to profitably execute voltage transitions on both 45 nm and 11 nm systems. This is not the case with amf, however, as its compute-bound windows are, on average, substantially smaller than those required for a DVFS switch.

Memory-bound window sizes for all kernels are too small for profitable DVFS at 45 nm, however easily meet window length requirements at 11 nm with fast DVFS. Comparing this table to FIG. 1, it becomes clear that lower transition latencies enable more effective optimization of STAP kernel, in general.

A detailed breakdown of window contents for the covar kernel is shown in Table 5 depicted in FIG. 8. The benchmark contains compute- and memory-bound instances of various sizes. It is clear from the data in Table 5 and the plot in FIG. 1 that not all windows are necessarily long enough to profitably execute a DVFS change at 45 nm. Window 2 in covar will not change the voltage frequency on the modeled 45 nm processor, while window 0 is just long enough to profitably execute a DVFS transition on a system with $L_T$=80 μsec. Both compute-bound windows are profitable and will transition to $f_H$.

Figure 9:
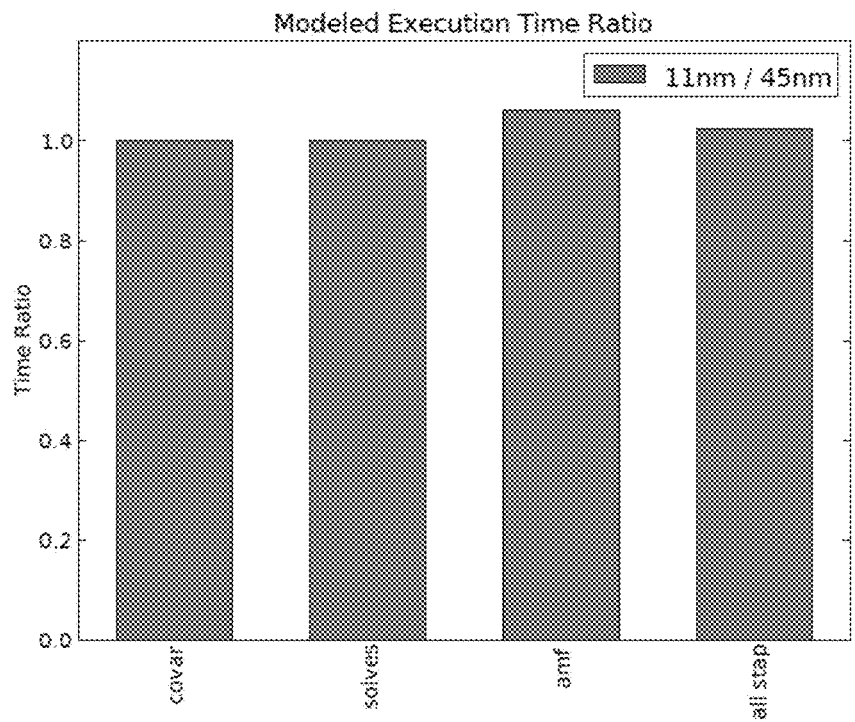
FIGS. 9 and 10 show ratios of execution times between code in which energy windows are generated according to one embodiment and the corresponding unoptimized code, for three different STAP kernels, for data processors implemented using 45 nm and 11 nm technologies, respectively.
Figure 10:
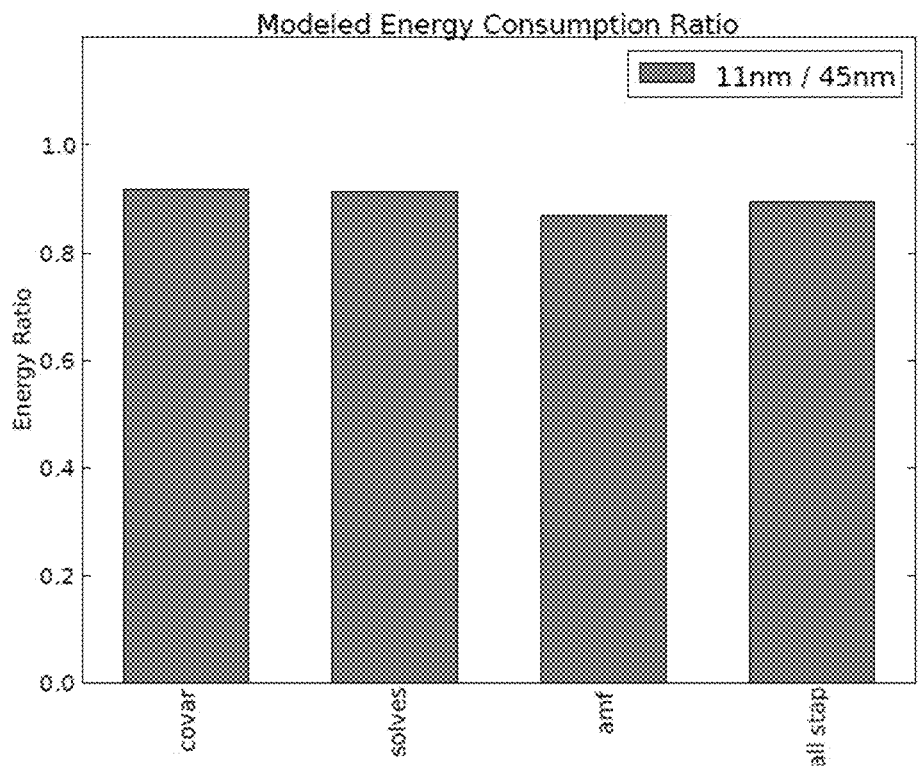

Results for EPS are shown in FIGS. 9 and 10. These figures show the ratio between execution time at 11 nm against execution time at 45 nm (FIG. 9) and energy consumption at 11 nm against 45 nm (FIG. 10). For various STAP benchmarks execution time increases slightly due to the penalty incurred by more frequent DVFS transitions. Since, across the various benchmarks, all but one compute window at 45 nm executes at $f_H$, this is expected. Several benchmarks show a significant (e.g. 5%, 10%, 20%, etc.), reduction in energy consumption.

The covar kernel shows an increase in execution time of 0.01% while reducing energy by 8.26%. The solves benchmark executes in 0.02% more time while consuming 8.77% less energy. The amf kernel slows the most, by 6.11%, however this is offset by a 13.23% decrease in energy consumption.

Table 6, depicted in FIG. 11, shows the number of window transitions for each benchmark. At 45 nm none of the memory windows are long enough to profitably perform a DVFS transition thus all windows execute at $f_H$. Decreasing transition latency at 11 nm produces a much smaller minimum window size for profitable DVFS transitions at all windows.

In addition to reduced energy for compute operations, lower memory costs and lower system overhead, and decreases in energy consumption can be explained by observing the percentage of memory operations in each benchmark, as shown in Table 7 shown in FIG. 12. In general, more memory operations leads to more time that the CPU can be placed into a low power state; which can directly translate to energy savings.

The number of DVFS transitions in amf from small memory windows inflicts a larger performance penalty due to the transition latency additions to execution time for each one. The other kernels are not as affected because of their larger and less frequently executed windows. The largest gains at 11 nm are seen in the amf benchmark where the ability to transition the CPU into a lower frequency during the numerous small memory windows provides a clear advantage in energy consumption over the 45 nm version.

In various embodiments described herein, a compiler can significantly reduce energy consumption of a data processing system. A platform-independent Power API can specify functions for monitoring and controlling voltage, frequency, energy, and power consumption and/or other parameters of a data processing system/chip.

In various embodiments, a polyhedral model based compiler (e.g. R-Stream™) can automatically create energy windows in program and embed system control operations at the beginning of these windows that set voltage and/or frequency and/or other attributes/parameters of system components to appropriate levels that maximize performance and minimize energy consumed.

In various embodiments, an energy model can project energy savings on current architectures and future PERFECT architectures. This model was implemented and used to derive rough estimates of projected benchmark performance and energy consumption on a simple architecture at both 45 nm and 11 nm nodes, i.e., data processors. These results indicate that significant energy savings can be achieved without substantially affecting performance.

In various embodiments, the optimizing compiler system described herein can directly address the issue of programmability and productivity in PERFECT hardware, where new hardware features for energy, such as explicitly managed scratchpad memories or dynamic voltage controls, threaten to make programs longer and programming more complex to benefit from the hardware. Energy proportional scheduling can save the programmer the time and potential errors to create a schedule and to explicitly annotate an application with voltage controls.

Energy windows can be created that can be managed within the program to lower the supply voltage or disable the non-used banks storing data that is outside the working set region. These space-time window schedules over complex main memory bank power controls emerging from new PERFECT hardware could save substantial system power.

We have shown the results of our optimizations on relatively straightforward DSP adaptive filter kernels, for STAP, which is a key component of current MTI and Phased Array sensing systems. We have also shown the results on an important image processing kernel, DPM, which is a component of state of the art object recognition systems. Power savings in such kernels can be important to increasing the qualitative capabilities of many systems. For example, power savings may allow placement of more and greater functionality on board on unmanned aerial platforms where power supplies are limited and cooling is scarce (air is thin at altitude). Power savings facilitated by various embodiments can improved battery life of smart phones and tablets performing image processing, computer vision, augmented reality, and numerical method codes. Various embodiments may improve battery life of autonomous robots relying upon computer vision and object detection. Some embodiments can reduce energy usage of high performance computing (HPC) clusters and other computers performing scientific computing applications including but not limited to basic linear algebra, computational fluid dynamics, computational astrophysics, and electromagnetic spectrum modeling and simulation, and clusters performing artificial intelligence training.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for optimizing energy consumption of a data processor while executing a program, the method comprising performing by a compilation processor the steps of:
generating within the program a first window;
determining window type of the first window; and
inserting a power control operation in the first window based on, at least in part, energy consumed by operations in the first window, the energy consumed being computed using: at least one parameter of at least one component of the data processor, at least one characteristic of the first window, and the window type of the first window;
wherein the window type of the first window is computation bound window or memory bound window; and
when the window type of the first window is computation bound window the power control operation changes an operating voltage of a CPU of the data processor from a first value to a second value greater than the first value only if a parameter related to compute operations is not less than a function of a transition latency associated with transitioning operation of the CPU from a first CPU frequency to a second CPU frequency greater than the first CPU frequency; and
when the window type of the first window is memory bound window the power control operation changes an operating voltage of a CPU of the data processor from a second value to a first value less than the second value only if a parameter related to memory operations is not less than a function of a transition latency associated with transitioning operation of the data processor from a second CPU frequency to a first CPU frequency less than the second frequency.

2. The method of claim 1, wherein generating the first window comprises generating a window of a particular size, the particular size being determined as a function of a transition latency associated with transitioning operation of a component of data processor from a first component-operating frequency to a second-component operating frequency different from the first component-operating frequency.

3. The method of claim 1, wherein:
the first window comprises at least one group comprising a sequence of statements of the program; and
generating the first window comprises:
analyzing a representation of the program in a particular format; and
forming, using that format, the at least one group, at a granularity based on, at least in part, at least one parameter of at least one component of the data processor.

4. The method of claim 1, wherein determining the window type of the first window comprises:
computing a number of computation operations associated with the first window;
computing a number of memory operations associated with the first window;
computing arithmetic intensity of the first window as a function of the number of computation operations and the number of memory operations; and
setting the window type to memory bound window if the arithmetic intensity is less than a threshold and otherwise setting the window type to computation bound window.

5. The method of claim 1, wherein determining the window type of the first window comprises inserting in the first window:
an expression to compute at runtime a number of computation operations associated with the first window;
an expression to compute at runtime a number of memory operations associated with the first window;
an expression to compute at runtime an arithmetic intensity of the first window as a function of the number of computation operations and the number of memory operations; and
an expression to set at runtime the window type to memory bound window if the arithmetic intensity is less than a threshold and otherwise to set the window type to computation bound window.

6. The method of claim 1, wherein the window type of the first window is selected from a group consisting of a computation bound window and a memory bound window.

7. The method of claim 1, wherein the at least one component of the data processor is selected from a group consisting of: a central processing unit (CPU), a memory bank, a cache memory module, a memory bus, a memory controller, and an application specific accelerator.

8. The method of claim 1, wherein the at least one parameter of the data processor is selected from a group consisting of: a transition latency associated with transitioning operation of at least one component of the data processor from a first frequency to a second frequency different from the first frequency; time to execute a compute operation; time to execute a memory operation; static power consumed by at least one component of the data processor; dynamic power consumed by at least one component of the data processor during a compute operation; and dynamic power consumed by at least one component of the data processor during a memory operation.

9. The method of claim 1, wherein the at least one characteristic of the first window is selected from a group consisting of: a count of compute operations, a count of memory operations, an estimated compute time, an estimated number of compute cycles, an estimated number of data access cycles; and a memory footprint.

10. The method of claim 1, wherein the parameter related to compute operations is selected from a group consisting of: a count of compute operations, an estimated number of cycles associated with the compute operations, a measured number of cycles associated with the compute operations, an estimated time required for the compute operations, a measured time required for the compute operations, an estimated energy required by the compute operations, a measured energy required by the compute operations, an estimated power required by the compute operations, and a measured power required by the compute operations.

11. The method of claim 1, wherein:
the power control operation further changes an operating frequency of a memory bus of the data processor from a second memory bus frequency to a first memory bus frequency that is less than the second memory bus frequency.

12. The method of claim 1, wherein the parameter related to memory operations is selected from a group consisting of: a count of memory operations, an estimated number of cycles associated with the memory operations, a measured number of cycles associated with the memory operations, an estimated time required for the memory operations, a measured time required for the memory operations, an estimated energy required by the memory operations, a measured energy required by the memory operations, an estimated power required by the memory operations, and a measured power required by the memory operations.

13. The method of claim 1, wherein:
the power control operation further changes an operating frequency of a memory bus of the data processor from a first memory bus frequency to a second memory bus frequency that is greater than the first memory bus frequency.

14. The method of claim 1, wherein:
the power control operation is based on, at least in part, an operation count associated with the first window, the operation count being determined at runtime; and
the power control operation modifies at runtime at least one attribute of at least one component of the data processor only if the operation count is greater than a threshold.

15. The method of claim 1, further comprising performing by the compilation processor the steps of:
generating within the program a second window;
determining window type of the second window;
inserting a power control operation in the second window based on, at least in part, at least one of: at least one parameter of the data processor, at least one characteristic of the second window, and the window type of the second window.

16. The method of claim 1, further comprising performing by the compilation processor the step of identifying and removing redundant power control operations.

17. The method of claim 1, wherein the power control operation modifies at runtime at least one attribute of at least one component of the data processor.

18. The method of claim 17, wherein:
the at least one component of the data processor comprises a central processing unit (CPU); and
modifying the at least one attribute comprises modifying at least one of an operating voltage of the CPU and an operating frequency of the CPU.

19. The method of claim 18, wherein:
the at least one component of the data processor further comprises a memory bus; and
modifying the at least one attribute further comprises modifying an operating frequency of the memory bus.

20. The method of claim 18, wherein:
the at least one component of the data processor further comprises a plurality of memory banks; and
modifying the at least one attribute further comprises switching off at least one of the plurality of memory banks.

21. The method of claim 18, wherein:
the at least one component of the data processor further comprises a cache memory manageable via both a hardware manager and a software manager; and
modifying the at least one attribute further comprises one of: (i) switching off the hardware manager and employing the software manager, and (ii) disengaging the software manager and switching on the hardware manager.

22. A compilation system for optimizing energy consumption of a data processor while executing a program thereby, the compilation system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
generate within the program a first window;
determine window type of the first window; and
insert a power control operation in the first window based on, at least in part, energy consumed by operations in the first window, the energy consumed being computed using: at least one parameter of at least one component of the data processor, at least one characteristic of the first window, and the window type of the first window;
wherein the window type of the first window is computation bound window or memory bound window; and
when the window type of the first window is computation bound window the power control operation changes an operating voltage of a CPU of the data processor from a first value to a second value greater than the first value only if a parameter related to compute operations is not less than a function of a transition latency associated with transitioning operation of the CPU from a first CPU frequency to a second CPU frequency greater than the first CPU frequency; and
when the window type of the first window is memory bound window the power control operation changes an operating voltage of a CPU of the data processor from a second value to a first value less than the second value only if a parameter related to memory operations is not less than a function of a transition latency associated with transitioning operation of the data processor from a second CPU frequency to a first CPU frequency less than the second frequency.

23. The compilation system of claim 22, wherein to generate the first window the processing unit is programmed to:
generate a window of a particular size; and
determine the particular size as a function of a transition latency associated with transitioning operation of a component of data processor from a first component-operating frequency to a second-component operating frequency different from the first component-operating frequency.

24. The compilation system of claim 22, wherein:
the first window comprises at least one group comprising a sequence of statements of the program; and
to generate the first window the processing unit is programmed to:

analyze a representation of the program in a particular format; and form, using that format, the at least one group, at a granularity based on, at least in part, at least one parameter of at least one component of the data processor.

25. The compilation system of claim 22, wherein for determining the window type of the first window the processing unit is programmed to:

compute a number of computation operations associated with the first window;

compute a number of memory operations associated with the first window;

compute arithmetic intensity of the first window as a function of the number of computation operations and the number of memory operations; and set the window type to memory bound window if the arithmetic intensity is less than a threshold and otherwise set the window type to computation bound window.

26. The compilation system of claim 22, wherein for determining the window type of the first window the processing unit is programmed to insert in the first window:

an expression to compute at runtime a number of computation operations associated with the first window;

an expression to compute at runtime a number of memory operations associated with the first window;

an expression to compute at runtime an arithmetic intensity of the first window as a function of the number of computation operations and the number of memory operations; and an expression to set at runtime the window type to memory bound window if the arithmetic intensity is less than a threshold and otherwise to set the window type to computation bound window.

27. The compilation system of claim 22, wherein the window type of the first window is selected from a group consisting of a computation bound window and a memory bound window.

28. The compilation system of claim 22, wherein the at least one component of the data processor is selected from a group consisting of: a central processing unit (CPU), a memory bank, a cache memory module, a memory bus, a memory controller, and an application specific accelerator.

29. The compilation system of claim 22, wherein the at least one parameter of the data processor is selected from a group consisting of: a transition latency associated with transitioning operation of at least one component of the data processor from a first frequency to a second frequency different from the first frequency; time to execute a compute operation; time to execute a memory operation; static power consumed by at least one component of the data processor; dynamic power consumed by at least one component of the data processor during a compute operation; and dynamic power consumed by at least one component of the data processor during a memory operation.

30. The compilation system of claim 22, wherein the at least one characteristic of the first window is selected from a group consisting of: a count of compute operations, a count of memory operations, an estimated compute time, an estimated number of compute cycles, an estimated number of data access cycles; and a memory footprint.

31. The compilation system of claim 22, wherein the parameter related to compute operations is selected from a group consisting of: a count of compute operations, an estimated number of cycles associated with the compute operations, a measured number of cycles associated with the compute operations, an estimated time required for the compute operations, a measured time required for the compute operations, an estimated energy required by the compute operations, a measured energy required by the compute operations, an estimated power required by the compute operations, and a measured power required by the compute operations.

32. The compilation system of claim 22, wherein:

the power control operation further changes an operating frequency of a memory bus of the data processor from a second memory bus frequency to a first memory bus frequency that is less than the second memory bus frequency.

33. The compilation system of claim 22, wherein the parameter related to memory operations is selected from a group consisting of: a count of memory operations, an estimated number of cycles associated with the memory operations, a measured number of cycles associated with the memory operations, an estimated time required for the memory operations, a measured time required for the memory operations, an estimated energy required by the memory operations, a measured energy required by the memory operations, an estimated power required by the memory operations, and a measured power required by the memory operations.

34. The compilation system of claim 22, wherein:

the power control operation further changes an operating frequency of a memory bus of the data processor from a first memory bus frequency to a second memory bus frequency that is greater than the first memory bus frequency.

35. The compilation system of claim 22, wherein:

the power control operation is based on, at least in part, an operation count associated with the first window, the operation count being determined at runtime; and the power control operation modifies at runtime at least one attribute of at least one component of the data processor only if the operation count is greater than a threshold.

36. The compilation system of claim 22, wherein the processing unit is further programmed to:

generate within the program a second window;

determine window type of the second window;

insert a power control operation in the second window based on, at least in part, at least one of: at least one parameter of the data processor, at least one characteristic of the second window, and the window type of the second window.

37. The compilation system of claim 22, wherein the processing unit is further programmed to identify and remove redundant power control operations.

38. The compilation system of claim 22, wherein the power control operation modifies at runtime at least one attribute of at least one component of the data processor.

39. The compilation system of claim 38, wherein:

the at least one component of the data processor comprises a central processing unit (CPU); and modifying the at least one attribute comprises modifying at least one of an operating voltage of the CPU and an operating frequency of the CPU.

40. The compilation system of claim 39, wherein:

the at least one component of the data processor further comprises a memory bus; and modifying the at least one attribute further comprises modifying an operating frequency of the memory bus.

41. The compilation system of claim 39, wherein:

the at least one component of the data processor further comprises a plurality of memory banks; and modifying the at least one attribute further comprises switching off at least one of the plurality of memory banks.

42. The compilation system of claim 39, wherein:

the at least one component of the data processor further comprises a cache memory manageable via both a hardware manager and a software manager; and modifying the at least one attribute further comprises one of: (i) switching off the hardware manager and employing the software manager, and (ii) disengaging the software manager and switching on the hardware manager.

* * * * *

UNITED STATES PATENT AND TRADEMARK OFFICE
CERTIFICATE OF CORRECTION

PATENT NO. : 10,180,828 B2
APPLICATION NO. : 14/699876
DATED : January 15, 2019
INVENTOR(S) : Muthu M. Baskaran et al.

Page 1 of 1

It is certified that error appears in the above-identified patent and that said Letters Patent is hereby corrected as shown below:

In the Specification

At Column 1, Line 13, insert:
-- STATEMENT OF GOVERNMENT SUPPORT
This invention was made with government support under Contract No. HR0011-12-C-0123 awarded by the Defense Advanced Research Projects Agency (DARPA). The government has certain rights in the invention. --

Signed and Sealed this
Second Day of August, 2022

Katherine Kelly Vidal
*Director of the United States Patent and Trademark Office*